US012671772B2

(12) United States Patent
Kaibara et al.

(10) Patent No.: US 12,671,772 B2
(45) Date of Patent: Jun. 30, 2026

(54) INFORMATION PROCESSING APPARATUS, NON-TRANSITORY COMPUTER READABLE MEDIUM, AND METHOD

(71) Applicant: FUJIFILM Business Innovation Corp., Tokyo (JP)

(72) Inventors: Kohei Kaibara, Kanagawa (JP); Aya Kuwano, Kanagawa (JP); Mitsuru Sato, Kanagawa (JP); Eri Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/180,885

(22) Filed: Mar. 9, 2023

(65) Prior Publication Data
US 2024/0064250 A1 Feb. 22, 2024

(30) Foreign Application Priority Data
Aug. 19, 2022 (JP) ................................. 2022-131328

(51) Int. Cl.
*H04N 1/00* (2006.01)
(52) U.S. Cl.
CPC ..... *H04N 1/00811* (2013.01); *H04N 1/00286* (2013.01); *H04N 1/00816* (2013.01); *H04N 1/00824* (2013.01)
(58) Field of Classification Search
CPC ........... H04N 1/00811; H04N 1/00286; H04N 1/00816; H04N 1/00824
See application file for complete search history.

(56) References Cited

U.S. PATENT DOCUMENTS

| | | | |
|---|---|---|---|
| 2016/0044197 A1* | 2/2016 | Kang ................. | H04N 1/00761 358/538 |
| 2016/0044198 A1* | 2/2016 | Kang ................... | H04N 1/3878 358/538 |
| 2017/0078528 A1* | 3/2017 | Kosaka ............. | H04N 1/00129 |
| 2017/0118374 A1* | 4/2017 | Tsujiguchi .............. | G06F 21/84 |
| 2019/0044727 A1* | 2/2019 | Scott ...................... | G06F 21/645 |
| 2019/0327389 A1* | 10/2019 | Miura .................. | H04N 1/6075 |
| 2020/0293616 A1* | 9/2020 | Nelson .................. | G06F 40/289 |
| 2023/0319196 A1* | 10/2023 | Maruyama ......... | H04N 1/00074 358/1.14 |
| 2024/0161451 A1* | 5/2024 | Kambara ............... | G06V 30/40 |

FOREIGN PATENT DOCUMENTS

| | | |
|---|---|---|
| JP | 2013-161425 A | 8/2013 |
| JP | 2014-021872 A | 2/2014 |

* cited by examiner

*Primary Examiner* — Iriana Cruz
(74) *Attorney, Agent, or Firm* — Oliff PLC

(57) ABSTRACT

An information processing apparatus includes a processor configured to: acquire a captured image of an image captured surface that is captured by an image capturer, a document and a mark portion that displays a predetermined mark being placed on the image captured surface; and cause a display to display the captured image to which content information that represents a content of a process that is defined in the mark portion and that is performed on image data is added before the document is optically read into the image data.

11 Claims, 23 Drawing Sheets

FIG. 3

13B

| MARKER TYPE | PLACEMENT METHOD | MARKER ID | PROCESS CONTENT |
|---|---|---|---|
| REGION SPECIFICATION | SURROUND | A01 | CUTTING |
| | | A02 | MASK |
| | | ⋮ | ⋮ |
| | SURROUND OR ROW SPECIFICATION | B01 | OCR, FILENAME |
| | | B02 | OCR, FOLDER NAME |
| | | ⋮ | ⋮ |
| | ⋮ | ⋮ | ⋮ |
| OUTPUT PROCESS SPECIFICATION | PLACEMENT AT FREELY SELECTED POSITION | H01 | MAIL ATTACHMENT |
| | | H02 | MAIL NOTIFICATION |
| | | H03 | PRINT |
| | | ⋮ | ⋮ |
| | ⋮ | ⋮ | ⋮ |
| SETTING | PLACEMENT AT FREELY SELECTED POSITION | M01 | PRESENCE OR ABSENCE OF NEXT DOCUMENT |
| | | M02 | PAGE SPECIFICATION |
| | | ⋮ | ⋮ |
| PROCESSING | PLACEMENT AT FREELY SELECTED POSITION | R01 | ENTIRE PAGE IS HIGHLIGHTED AND DISPLAYED IN SERVICE IN CORPORATION WITH ANOTHER COMPANY |
| | | ⋮ | ⋮ |
| ⋮ | ⋮ | ⋮ | ⋮ |

13C

| USERNAME | MARKER COLOR | SETTING CONTENT | SETTING TIME AND DATE |
|---|---|---|---|
| USER A | GREEN | TO GIVE FILENAME | July 1, 2022 |
| | | TO GIVE FILENAME | July 10, 2022 |
| | | ⋮ | ⋮ |
| | PURPLE | MASK PROCESS | July 2, 2022 |
| | | MASK PROCESS | July 11, 2022 |
| | | ⋮ | ⋮ |
| | ⋮ | ⋮ | ⋮ |
| USER B | ⋮ | ⋮ | ⋮ |
| ⋮ | ⋮ | ⋮ | ⋮ |

INFORMATION PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-131328 filed Aug. 19, 2022.

BACKGROUND

(i) Technical Field

The present disclosure relates to an information processing apparatus, a non-transitory computer readable medium, and a method.

(ii) Related Art

In Japanese Unexamined Patent Application Publication No. 2013-161425, a program of automatically trimming the data of a photograph that is captured by a camera in a cellular phone is disclosed.

SUMMARY

A known technique is to detect a marker that serves as a mark portion that is optically read together with a document and to perform a process that is defined in the detected marker on the image data of the document. As for the technique, however, a user is unable to grasp the content of the process until the process that is defined in the marker is performed on the image data of the document.

Aspects of non-limiting embodiments of the present disclosure relate to enabling the user to grasp the content of the process before the process that is defined in the mark portion is performed on the image data of the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: acquire a captured image of an image captured surface that is captured by an image capturer, a document and a mark portion that displays a predetermined mark being placed on the image captured surface; and cause a display to display the captured image to which content information that represents a content of a process that is defined in the mark portion and that is performed on image data is added before the document is optically read into the image data.

BRIEF DESCRIPTION OF THE DRAWINGS

Exemplary embodiments of the present disclosure will be described in detail based on the following figures, wherein:

FIG. 3 schematically illustrates an example of the structure of a marker information database;

DETAILED DESCRIPTION

Exemplary embodiments of the present disclosure will hereinafter be described in detail with reference to the drawings. In an example described according to the present exemplary embodiment, an information processing apparatus that uses a technique according to the present disclosure is used for an image processing apparatus that is disposed in an office and that includes a document camera. A target to which the technique according to the present disclosure is applied is not limited to the office but may be a target at any location such as a school or a household, provided that the image processing apparatus is installable at the location. A target to which the information processing apparatus that uses the technique according to the present disclosure is applied is not limited to the image processing apparatus but may be, for example, an image reading apparatus that reads an image or an image transmitting apparatus that transmits a read image to another apparatus.

First Exemplary Embodiment

Figure 1:
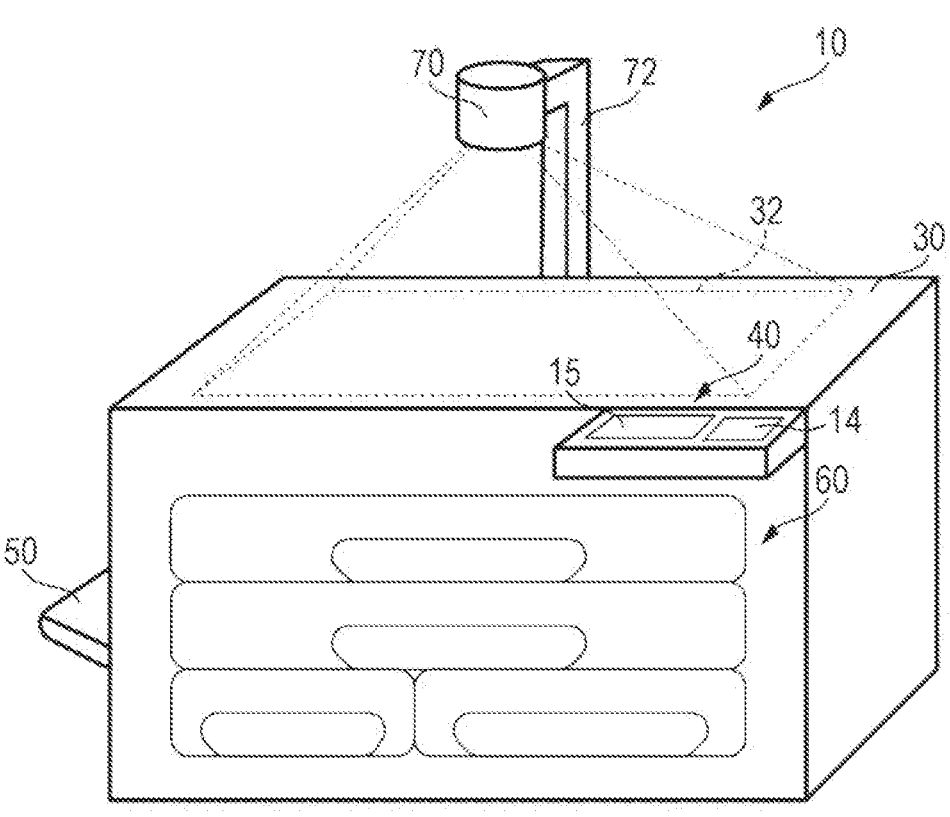
FIG. 1 is a perspective view of an example of the entire structure of an image processing apparatus.

An image processing apparatus 10 according to a first exemplary embodiment will now be described. FIG. 1 is a perspective view of an example of the entire structure of the image processing apparatus 10.

As illustrated in FIG. 1, the image processing apparatus 10 includes a document table 30 that has an upper surface on which a document is placed, a user interface unit (referred to below as a "UI unit") 40 for displaying various kinds of information and for inputting various kinds of information, a tray 50 onto which paper with a formed image is discharged, and a paper feeding unit 60 that feeds various kinds of paper.

The image processing apparatus 10 also includes a document camera 70 that is capable of capturing an image on the upper surface of the document table 30. A first end portion of an arm 72 is fixed to the rear of the document table 30, and the document camera 70 is disposed on a second end portion of the arm 72 and is positioned such that the angle of view for image capturing substantially matches a document placement region 32 of the document table 30. The document camera 70 is an example of an "image capturer". The document placement region 32 is an example of an "image captured surface".

According to the first exemplary embodiment, the document camera 70 captures a color image but is not limited thereto. For example, the document camera 70 may capture a monochrome image or a grayscale image.

The UI unit 40 includes an input unit 14 that includes various switches and a display 15 that includes, for example, a liquid-crystal display. The display 15 is a so-called touch screen display that includes a touch screen where a front surface of the display is optically transparent. The display 15 is an example of a "display".

The image processing apparatus 10 is a digital multifunction peripheral that has an image printing function, an image reading function, an image transmitting function, and so on. However, the image processing apparatus 10 is not limited thereto, provided that the image processing apparatus 10 has at least the image reading function.

Figure 2:
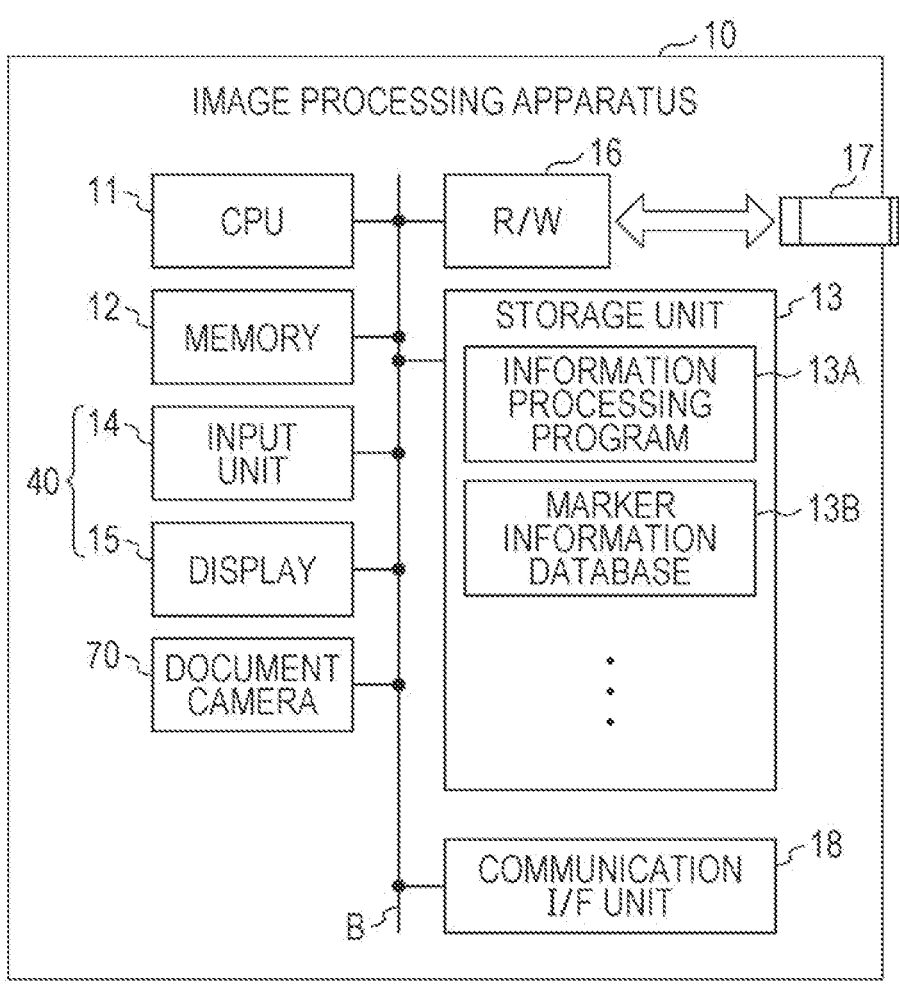
FIG. 2 is a first block diagram of an example of the hardware configuration of an electrical system of the image processing apparatus.

The structure of an electrical system of the image processing apparatus 10 will now be described with reference to FIG. 2. FIG. 2 is a first block diagram of an example of the hardware configuration of the electrical system of the image processing apparatus 10.

As illustrated in FIG. 2, the image processing apparatus 10 includes a central processing unit (CPU) 11 that is an example of a processor, a memory 12 that serves as a temporary storage area, a non-volatile storage unit 13, and the UI unit 40 that includes the input unit 14 and the display 15 described above. The image processing apparatus 10 also includes a medium reader-writer device (R/W) 16, a communication interface (UF) unit 18, and the document camera 70 described above. The CPU 11, the memory 12, the storage unit 13, the UI unit 40, the medium reader-writer device 16, the communication OF unit 18, and the document camera 70 are connected to each other via a bus B. The medium reader-writer device 16 reads information that is written in a recording medium 17 and writes information to the recording medium 17.

Examples of the storage unit 13 include a hard disk drive (HDD), a solid state drive (SSD), and a flash memory. The storage unit 13 stores an information processing program 13A. The recording medium 17 to which the information processing program 13A is written is connected to the medium reader-writer device 16, the medium reader-writer device 16 reads the information processing program 13A from the recording medium 17, and the information processing program 13A is stored (installed) in the storage unit 13. The CPU 11 loads the information processing program

13A from the storage unit 13 into the memory 12 and sequentially performs processes that are included in the information processing program 13A.

The storage unit 13 stores a marker information database 13B. The marker information database 13B will be described in detail later.

According to the first exemplary embodiment, a barcode, a two-dimensional code, or a marker that uses a mechanically readable code such as a pattern image that is printed in accordance with a predetermined rule is used as a marker. According to the first exemplary embodiment, the mechanically readable code is a code that contains information that represents the content of a process that is performed on the image data of an image of the document. The marker is an example of a "mark portion". The marker is not limited to these forms but may be a marker that does not contain a code such as the mechanically readable code. In this case, the content of the process described above may be defined depending on a difference in appearance such as the shape, dimensions, and color of the marker. Even in the case where the mechanically readable code is used as the marker, the content of the process may be defined depending on the kind of the color of the marker.

The process described above is defined in the marker, and examples thereof include an image process, an output process related to the output of the image data, and a setting process related to various settings. Examples of the image process include a cutting process, a mask process, an optical character recognition or reader (OCR) process, and a processing process. Examples of the output process include a transfer process for an attachment or a notification in an electronic mail and a print (image formation) process. Examples of the setting process include a process of specifying the presence or absence of a next document and a process of specifying a page. The marker is classified into a type such as an image process marker in which the image process is defined, an output process marker in which the output process is defined, or a setting marker in which setting process is defined and is prepared in advance.

The marker information database 13B will now be described with reference to FIG. 3. FIG. 3 schematically illustrates an example of the structure of the marker information database 13B.

The marker information database 13B is a database in which information related to the marker described above is registered. As for the marker information database 13B, as illustrated in FIG. 3, pieces of information about a marker type, a placement method, a marker ID (identification), and a process content, for example, are associated with each other and stored therein.

The marker type is information that represents the type of the marker. The placement method is information that represents a method of placing the marker. The marker ID is information that is added in advance so as to differ depending on the type of the marker and the process content in order to identify the corresponding marker. The process content is information that represents the content of the process that is defined in the corresponding marker.

In an example illustrated in FIG. 3, for example, as for a marker to which "A01" is added as the marker ID, information is registered such that the marker type is region specification, the placement method is a method of surrounding a region to be processed, and the content of the process is image cutting.

That is, according to the first exemplary embodiment, the marker does not contain information that represents the content of the process itself, but the marker contains information that represents the marker ID. According to the first exemplary embodiment, the information that represents the content of the process corresponding to the marker ID is acquired from the marker information database 13B, and the content of the corresponding process is identified. However, this is not a limitation, and the marker may contain the information that represents the content of the process itself. In this case, the marker information database 13B is not needed.

Figure 4:
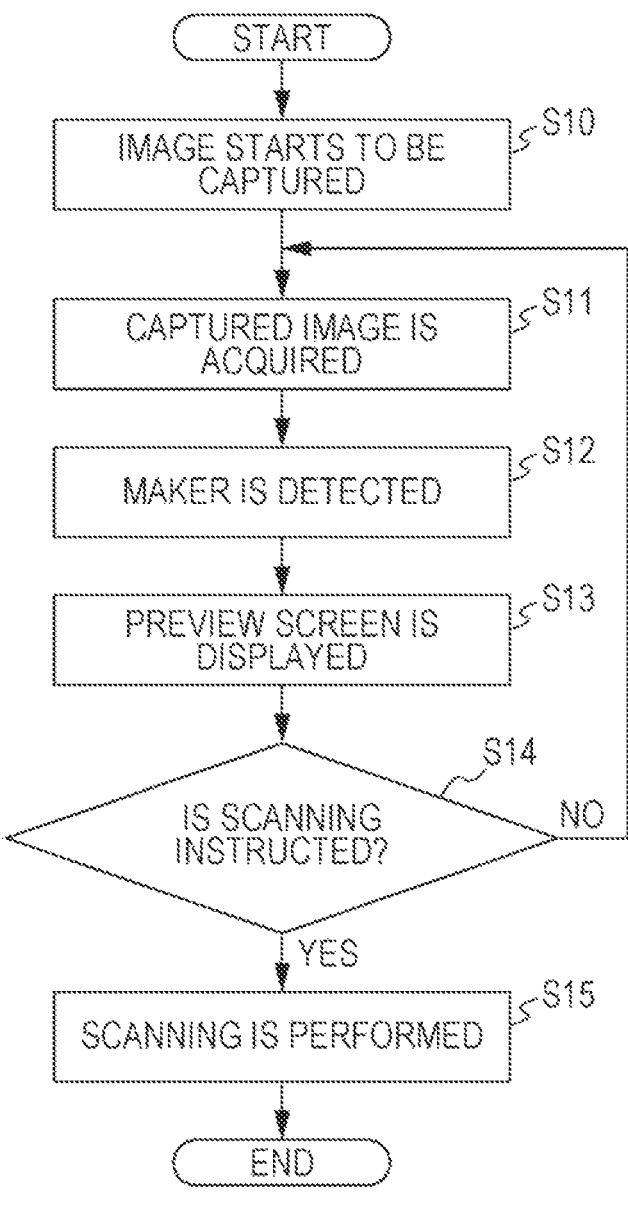
FIG. 4 is a flowchart illustrating the flow of a display process that is performed by the image processing apparatus.

The flow of the process that is performed by the image processing apparatus 10 will now be described with reference to FIG. 4. FIG. 4 is a flowchart illustrating the flow of a display process that is performed by the image processing apparatus 10 to display a captured image of the document placement region 32 that is captured by the document camera 70 before the document is optically read into the image data, that is, before the document is scanned. The CPU 11 reads and loads the information processing program 13A from the storage unit 13 into the memory 12 and runs the information processing program 13A, and consequently, the display process is performed. In the case where a user performs a predetermined operation by using the UI unit 40, the CPU 11 starts the display process. Before the predetermined operation is performed, the user places the document and the marker in the document placement region 32. The timing with which the display process starts is not limited by the operation of the user. For example, the display process may start in the case where a predetermined time has elapsed after the document and the marker are placed, and the document and the marker come to rest.

At a step S10 illustrated in FIG. 4, the CPU 11 instructs the document camera 70 to capture the image, and the image of the document placement region 32 starts to be captured. The flow proceeds to a step S11.

At the step S11, the CPU 11 acquires the captured image of the document placement region 32 that is captured by the document camera 70 at the step S10. The flow proceeds to a step S12.

At the step S12, the CPU 11 detects the image of the marker in the captured image that is acquired at the step S11. The flow proceeds to a step S13. For example, the CPU 11 uses a known pattern matching technique to detect the image of the marker.

At the step S13, the CPU 11 causes the display 15 to display a preview screen displaying the captured image to which content information that represents the content of the process that is defined in the marker that is detected at the step S12 and that is performed on the image data of the document is added. The flow proceeds to a step S14. The preview screen will be described in detail later.

At the step S14, the CPU 11 determines whether an instruction for scanning is received on the preview screen. If the CPU 11 determines that the instruction for scanning is received (YES at the step S14), the flow proceeds to a step S15. If the CPU 11 determines that the instruction for scanning is not received (NO at the step S14), the flow returns to the step S11. For example, in the case where a run button 82 described later is operated on the preview screen, the CPU 11 determines that the instruction for scanning is received.

At the step S15, the CPU 11 scans the document into the image data and performs the process that is defined in the marker that is detected at the step S12. This is the end of the display process.

Placement examples for the document and the marker on the document table 30 and display examples for the preview screen will now be described.

Figure 5:
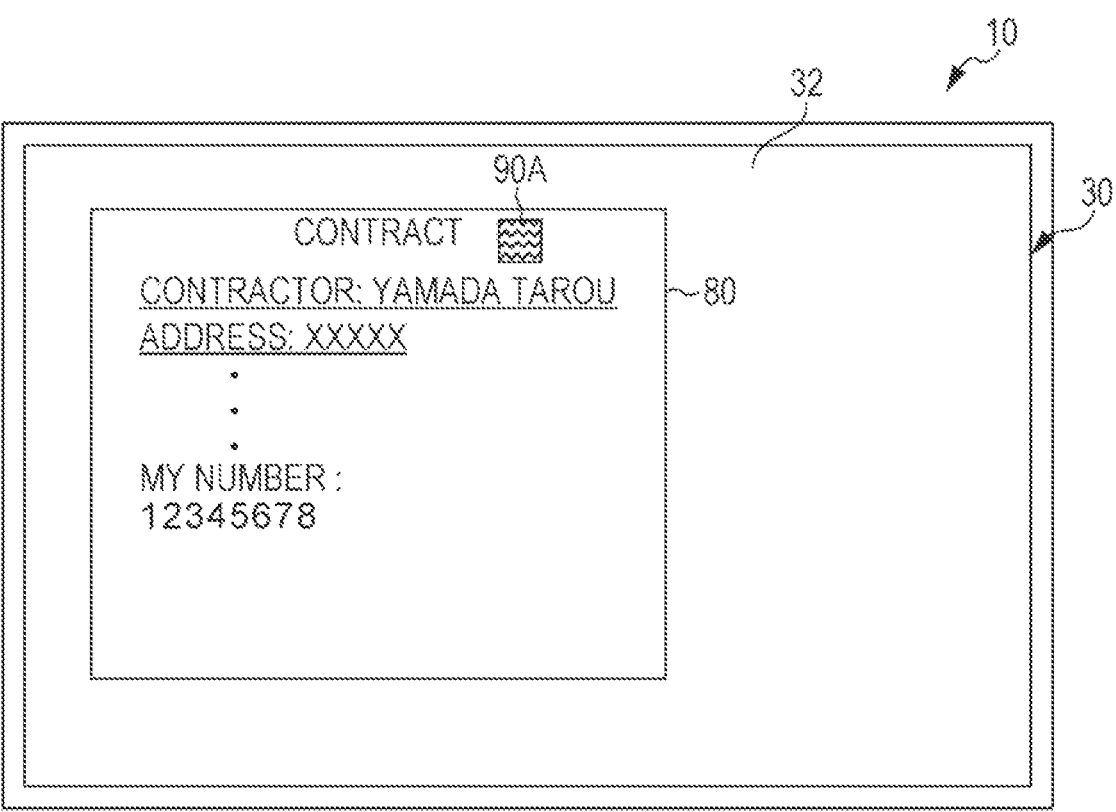
FIG. 5 illustrates a first placement example for a document and markers on a document table.

FIG. 5 illustrates a first placement example for a document 80 and markers 90 on the document table 30. As for the image processing apparatus 10, the user places the document 80 and the markers 90 at freely selected positions in the document placement region 32 of the document table 30 when the display process illustrated in FIG. 4 is started. In the following description, multiple markers such as an output process marker 90A and an image process marker 90B appear. In the case where these are not distinguished in the description, these are correctively referred to as the "markers 90".

In an example illustrated in FIG. 5, the output process marker 90A in which the transfer process is defined as the output process is placed on an upper portion of the document 80.

Figure 6:
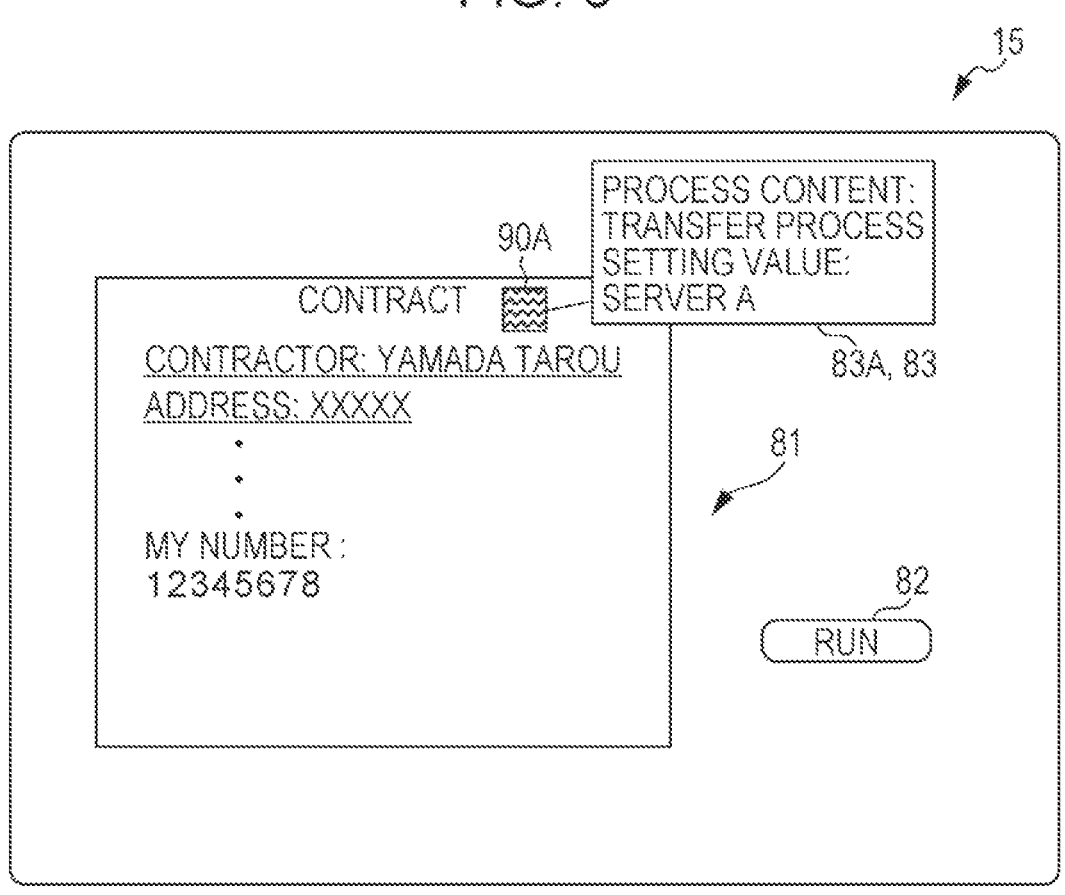
FIG. 6 illustrates a first display example for a preview screen.

FIG. 6 illustrates a first display example for the preview screen. Specifically, FIG. 6 illustrates the preview screen suitable for the placement example for the document 80 and the markers 90 illustrated in FIG. 5.

A captured image 81 and the run button 82 are displayed on the preview screen illustrated in FIG. 6.

The captured image 81 is acquired by the document camera 70 in a manner in which the image of the document placement region 32 in which the document 80 and the output process marker 90A are placed is captured. On the right of the image of the output process marker 90A in the captured image 81 illustrated in FIG. 6, content information 83A that represents the content of the process that is defined in the output process marker 90A is displayed. For example, the content information 83A represents that the process content in the output process marker 90A is the transfer process and that a setting value is a server A.

The run button 82 is a button for scanning the document 80 into the image data and for performing the process that is defined in each of the markers 90 placed in the document placement region 32. For example, in the case where the run button 82 is operated on the preview screen illustrated in FIG. 6, the CPU 11 scans the document 80 into the image data. The CPU 11 transmits the image data of the scanned document 80 to a destination (such as the server A) that is defined in the output process marker 90A.

As for the image processing apparatus 10, the CPU 11 acquires the captured image 81 of the document placement region 32 that is captured by the document camera 70 as described above. The CPU 11 causes the display 15 to display the captured image 81 to which content information 83 is added before the document 80 is scanned into the image data.

As for the image processing apparatus 10, a process that is associated with each of the markers 90 is defined before the display 15 displays the captured image 81, specifically, before the display 15 displays the preview screen. According to the first exemplary embodiment, the CPU 11 identifies the marker ID that is represented by the detected marker 90 at the step S12 illustrated in FIG. 4 and acquires information corresponding to the identified marker ID from the marker information database 13B. The CPU 11 defines that the process that is associated with the marker 90 is a process corresponding to the acquired marker ID.

Figure 7:
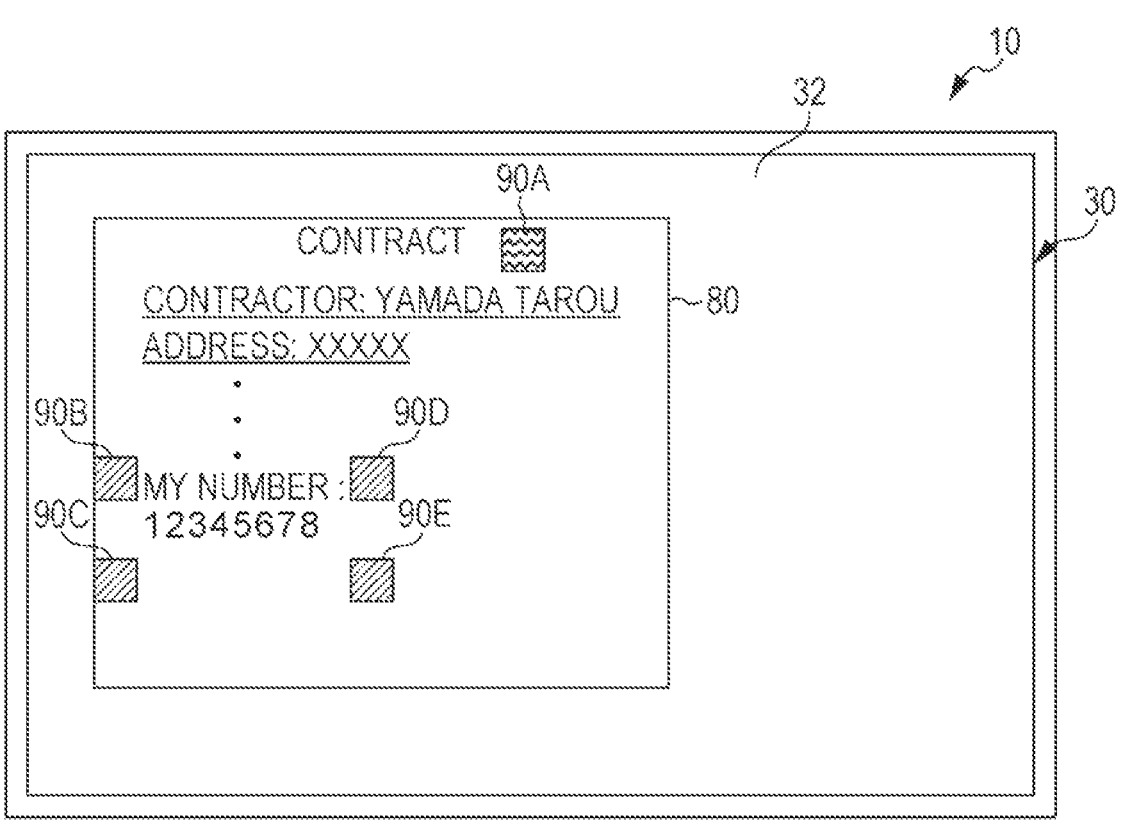
FIG. 7 illustrates a second placement example for the document and the markers on the document table.

FIG. 7 illustrates a second placement example for the document 80 and the markers 90 on the document table 30. In an example illustrated in FIG. 7, the output process marker 90A in which the transfer process is defined as the output process is placed on an upper portion of the document 80. In the example illustrated in FIG. 7, the image process marker 90B and image process markers 90C to 90E in which the mask process is defined as the image process are placed so as to surround the numeral of my number on the document 80.

Figure 8:
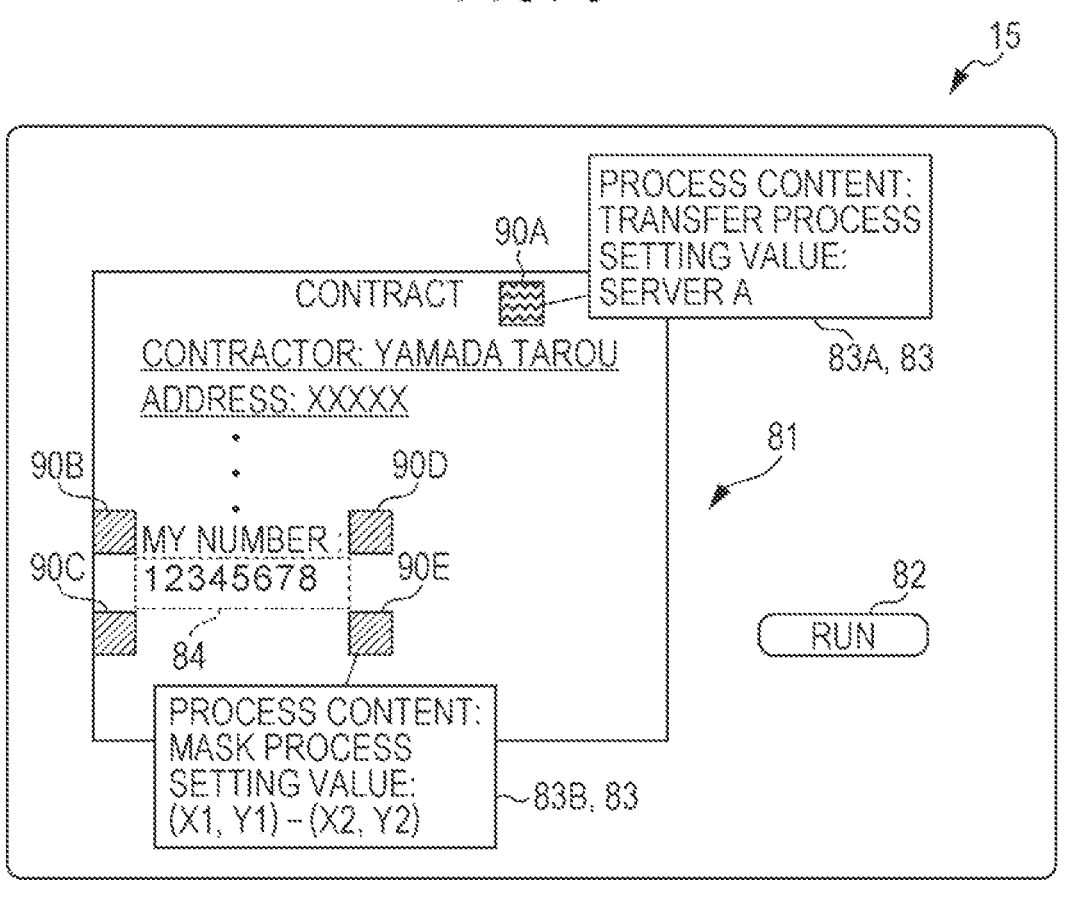
FIG. 8 illustrates a second display example for the preview screen.

FIG. 8 illustrates a second display example for the preview screen. Specifically, FIG. 8 illustrates the preview screen suitable for the placement example for the document 80 and the markers 90 illustrated in FIG. 7.

On the right of the image of the output process marker 90A in the captured image 81 illustrated in FIG. 8, the content information 83A that represents the content of the process that is defined in the output process marker 90A is displayed. Below the image of the image process marker 90E in the captured image 81, content information 83B that represents the content of the process that is defined in the image process markers 90B to 90E is displayed.

For example, the content information 83B represents that the process content in the image process markers 90B to 90E is the mask process and that the setting value is (X1, Y1)–(X2, Y2). The setting value is a single piece of coordinate information that represents a region that is a target for the process that is defined in the image process markers 90B to 90E. For example, the coordinate information is information that represents coordinates on a two-dimensional coordinate system the origin of which is located at an upper left corner of the document 80.

As for the preview screen illustrated in FIG. 8, the CPU 11 causes the display 15 to display the captured image 81 to which region information 84 that represents the region that is the target for the process that is defined in the image process markers 90B to 90E is added. An example of the region information 84 is a rectangular frame illustrated by using a dashed line.

Figure 9:
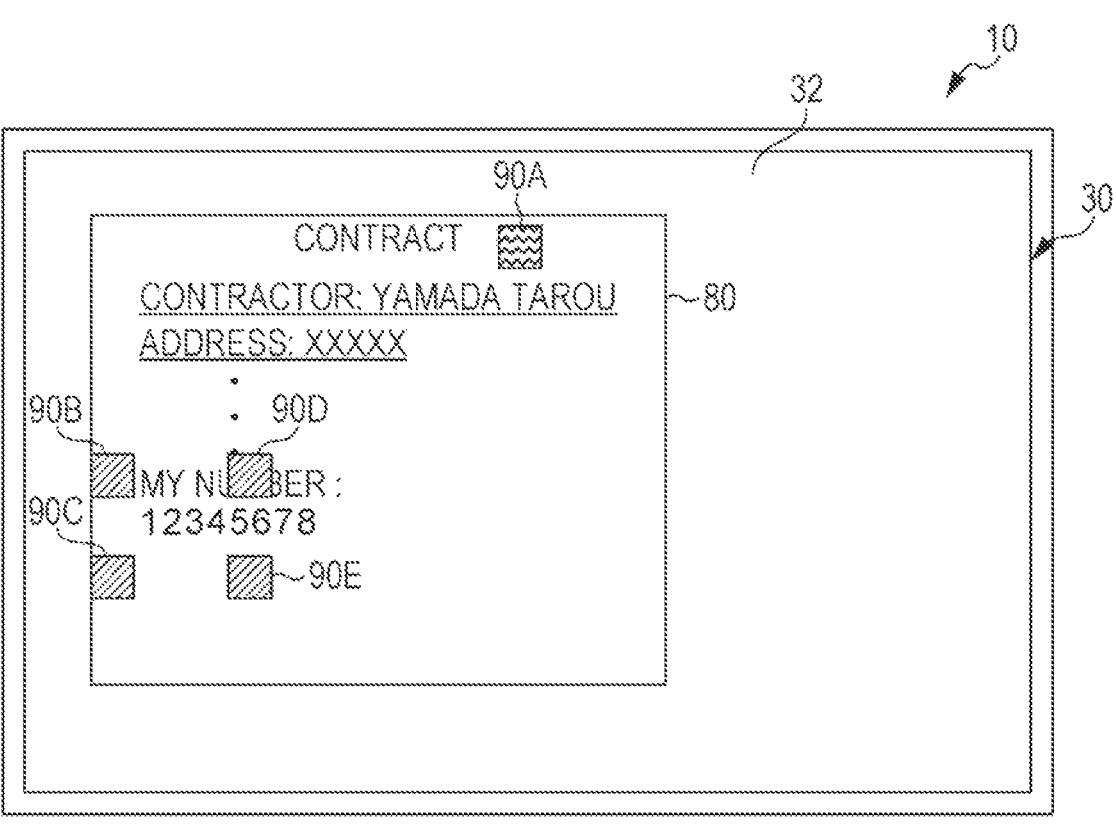
FIG. 9 illustrates a third placement example for the document and the markers on the document table.

FIG. 9 illustrates a third placement example for the document 80 and the markers 90 on the document table 30. Specifically, in the placement example illustrated in FIG. 9, the placement of the image process marker 90D and the image process marker 90E in the document placement region 32 is changed in a left-hand direction from the placement example illustrated in FIG. 7.

Figure 10:
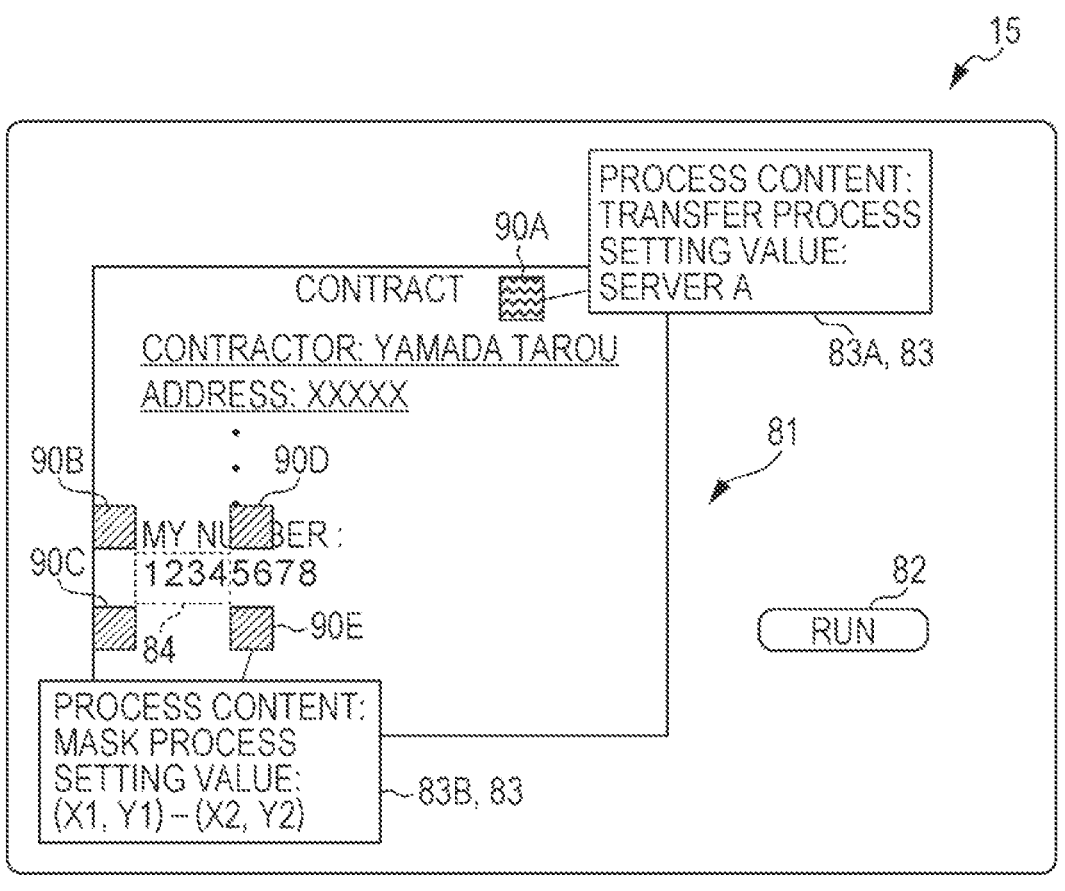
FIG. 10 illustrates a third display example for the preview screen.

FIG. 10 illustrates a third display example for the preview screen. Specifically, FIG. 10 illustrates the preview screen suitable for the placement example for the document 80 and the markers 90 illustrated in FIG. 9.

As for the preview screen illustrated in FIG. 10, the placement of the image process marker 90D and the image process marker 90E in the document placement region 32 is changed, and consequently, the region that is represented by the region information 84 changes. Specifically, as for the preview screen illustrated in FIG. 10, the region that is represented by the region information 84 is shrunk from that on the preview screen illustrated in FIG. 8.

As for the image processing apparatus 10, the CPU 11 changes the region that is represented by the region information 84 on the display 15 in the case where the placement of the markers 90 in the document placement region 32 is changed as described above.

Second Exemplary Embodiment

An image processing apparatus 10 according to a second exemplary embodiment will now be described where the same description as the other exemplary embodiments is omitted or simplified.

Figure 11:
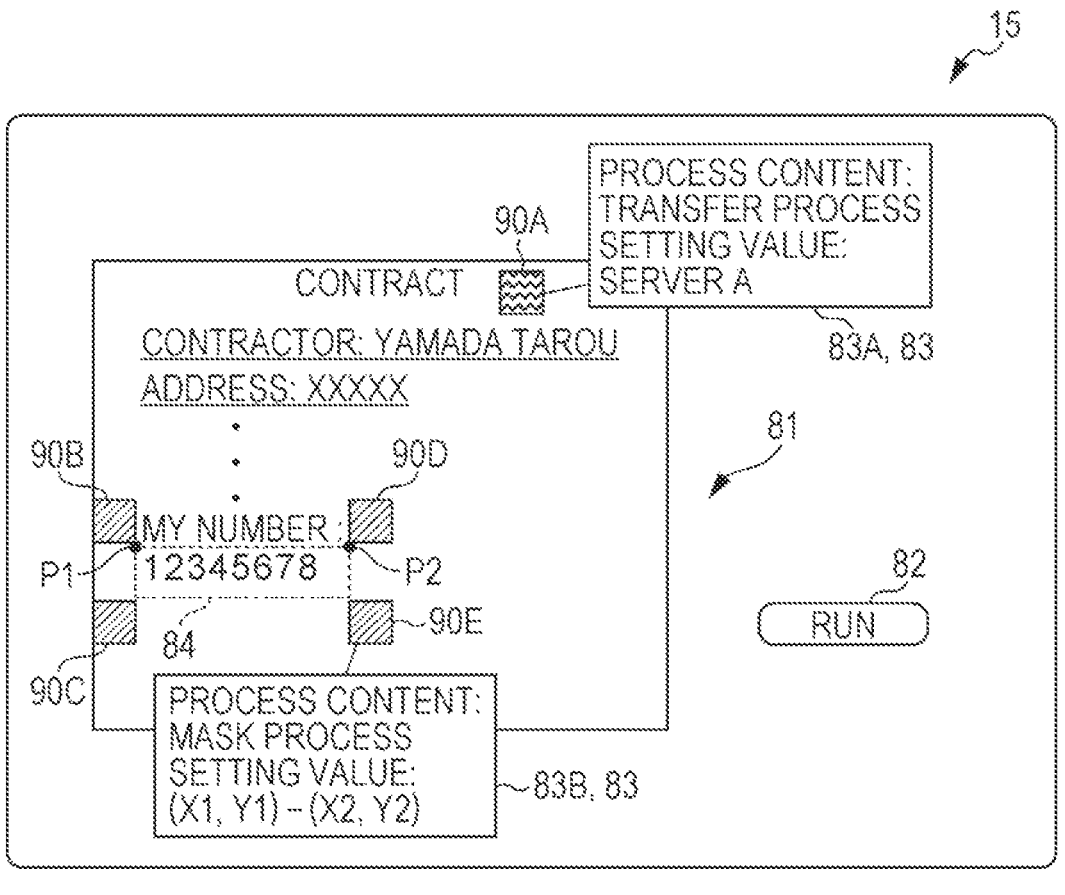
FIG. 11 illustrates a fourth display example for the preview screen.

FIG. 11 illustrates a fourth display example for the preview screen. Specifically, FIG. 11 illustrates the preview screen suitable for the placement example for the document 80 and the markers 90 illustrated in FIG. 7.

The preview screen illustrated in FIG. 11 is basically the same as the preview screen illustrated in FIG. 8 but differs therefrom in that a point P1 and a point P2 are displayed at upper left and upper right corners of the region that is represented by the region information 84. The user may change the shape of the region that is represented by the region information 84 by performing a swiping operation in a freely selected direction (the vertical direction and the horizontal direction) with a finger pressing the point P1 or the point P2.

Figure 12:
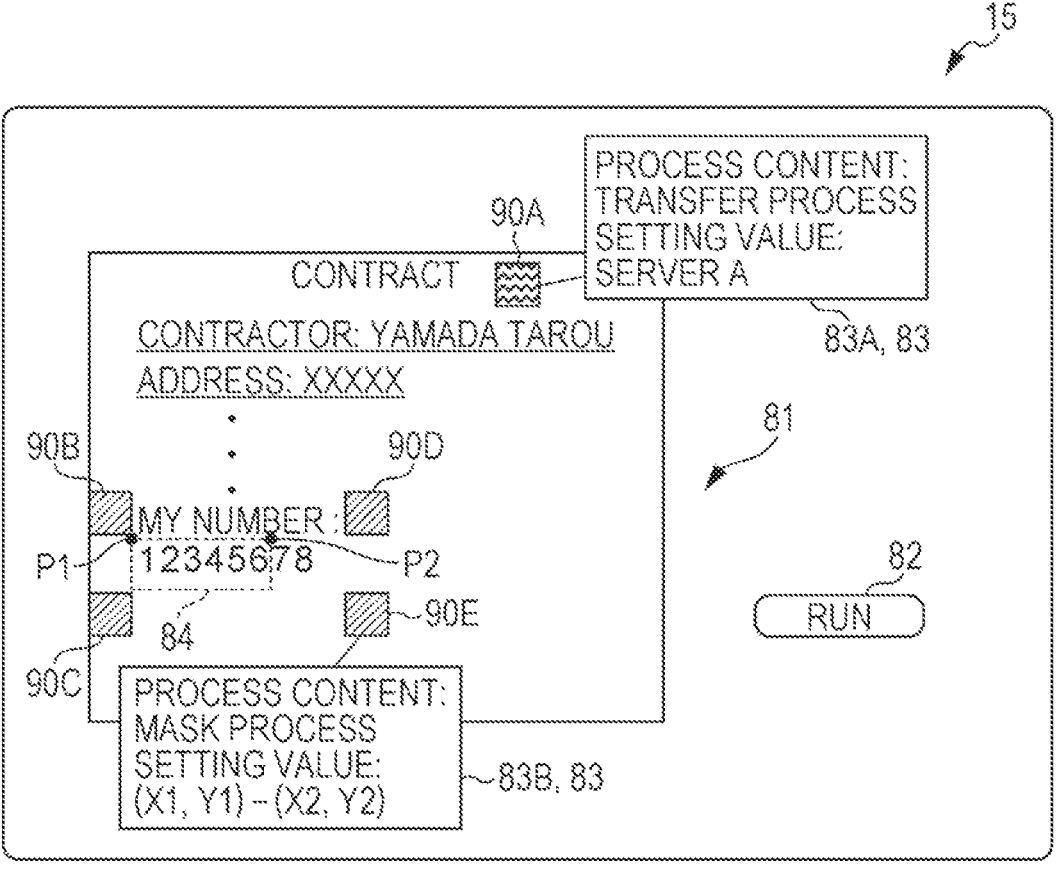
FIG. 12 illustrates a fifth display example for the preview screen.

FIG. 12 illustrates a fifth display example for the preview screen. As for the preview screen illustrated in FIG. 12, the position of the point P2 is changed in the left-hand direction from the preview screen illustrated in FIG. 11. Following this, as for the preview screen illustrated in FIG. 12, the region that is represented by the region information 84 is shrunk from that on the preview screen illustrated in FIG. 11.

Figure 13:
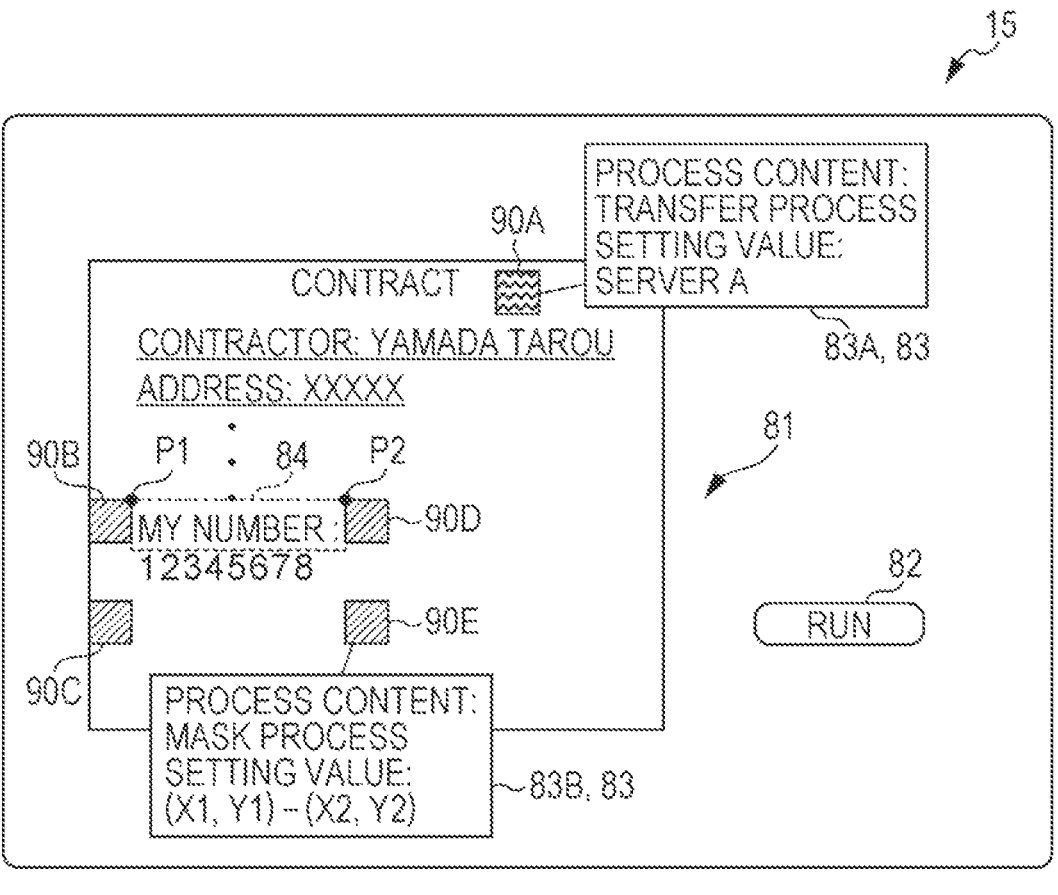
FIG. 13 illustrates a sixth display example for the preview screen.

FIG. 13 illustrates a sixth display example for the preview screen. Specifically, as for the preview screen illustrated in FIG. 13, the position of the region that is represented by the region information 84 is changed from that on the preview screen illustrated in FIG. 11.

The user may change the position of the region that is represented by the region information 84 by performing a swiping operation in a freely selected direction (the vertical direction and the horizontal direction) with a finger pressing a portion on the region information 84 other than the point P1 and the point P2. For example, as for the preview screen illustrated in FIG. 13, the position of the region that is represented by the region information 84 is changed upward from that on the preview screen illustrated in FIG. 11.

As for the image processing apparatus 10, the CPU 11 receives, on the preview screen, changes in the position and shape of the region that is represented by the region information 84 by way of a user operation into the display 15 as described above.

Third Exemplary Embodiment

An image processing apparatus 10 according to a third exemplary embodiment will now be described where the same description as the other exemplary embodiments is omitted or simplified.

Figure 14:
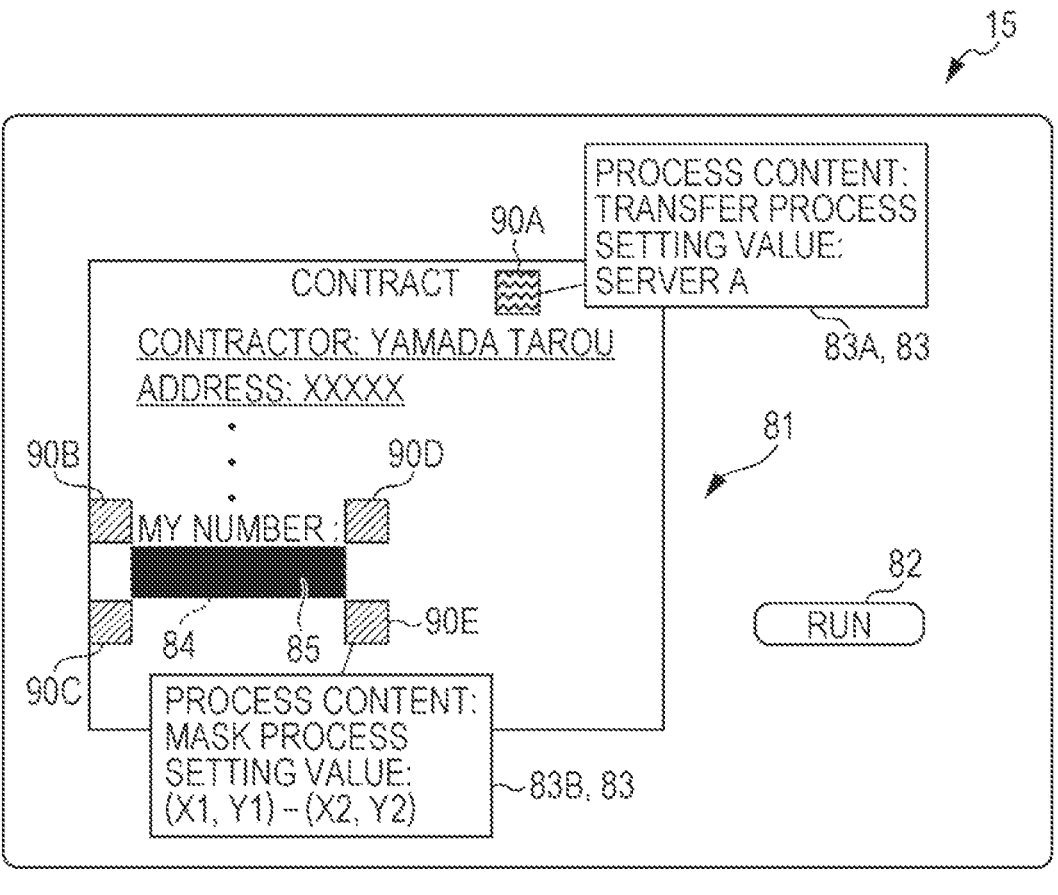
FIG. 14 illustrates a seventh display example for the preview screen.

FIG. 14 illustrates a seventh display example for the preview screen. Specifically, FIG. 14 illustrates the preview screen suitable for the placement example for the document 80 and the markers 90 illustrated in FIG. 7.

The preview screen illustrated in FIG. 14 is basically the same as the preview screen illustrated in FIG. 8 but differs therefrom in that an example of performing the process that is defined in the markers 90 on the region that is represented by the region information 84 is illustrated. Specifically, as for the preview screen illustrated in FIG. 14, the captured image 81 to which implementation example information 85 is added is displayed, and the implementation example information 85 represents an example of performing the mask process that is defined in the image process markers 90B to 90E on the region that is represented by the region information 84. An example of the implementation example information 85 is a black portion inside the frame of the region information 84.

As for the image processing apparatus 10, the CPU 11 causes the display 15 to display, on the preview screen, the captured image 81 to which the implementation example information 85 that represents the example of performing the process that is defined in the markers 90 on the region that is represented by the region information 84 is added as described above.

Fourth Exemplary Embodiment

An image processing apparatus 10 according to a fourth exemplary embodiment will now be described where the same description as the other exemplary embodiments is omitted or simplified.

According to the fourth exemplary embodiment, a marker that does not contain a code such as the mechanically readable code is used unlike the first to third exemplary embodiments. For this reason, according to the fourth exemplary embodiment, it is necessary to define a process that is associated with the marker that is placed in the document placement region 32 before the document is scanned into the image data. According to the fourth exemplary embodiment, various kinds of markers that are classified depending on a difference in appearance such as a shape, dimensions, and color are prepared. According to the fourth exemplary embodiment, for example, the difference in appearance is a "difference in color".

Figure 15:
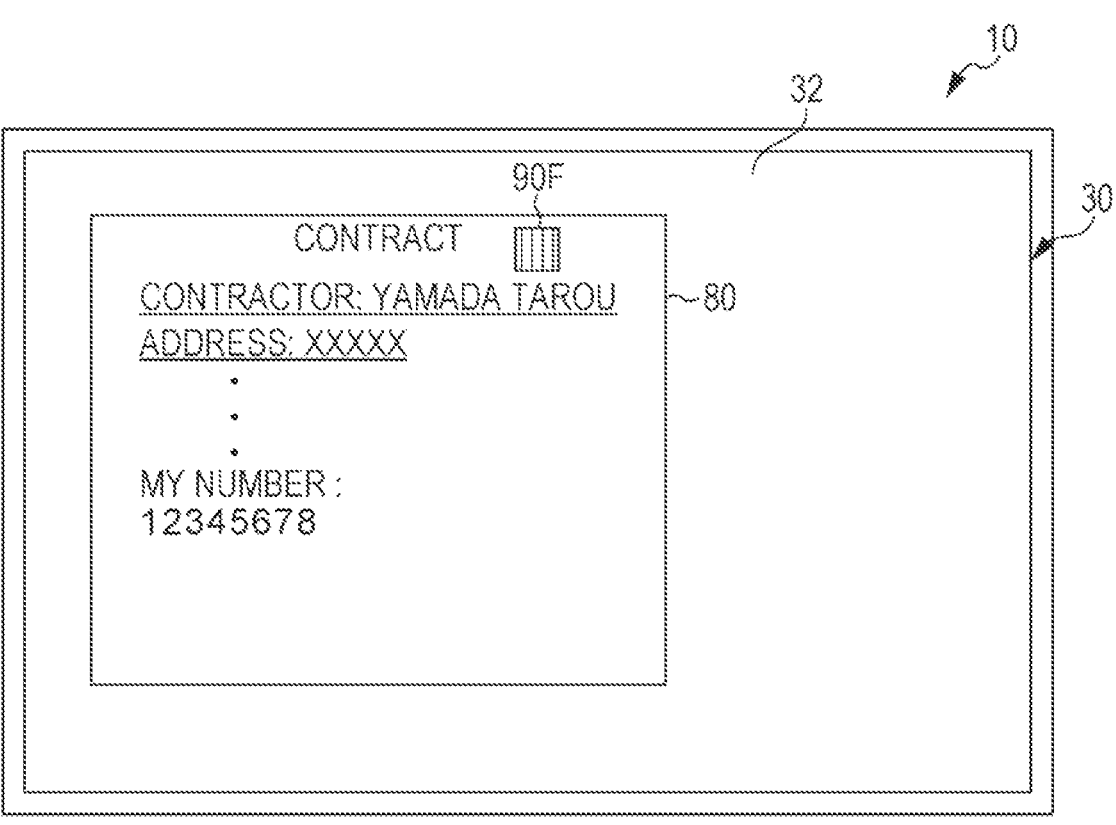
FIG. 15 illustrates a fourth placement example for the document and the markers on the document table.

FIG. 15 illustrates a fourth placement example for the document 80 and the markers 90 on the document table 30. In an example illustrated in FIG. 15, a marker 90F in which no process is defined is placed on an upper portion of the document 80.

Figure 16:
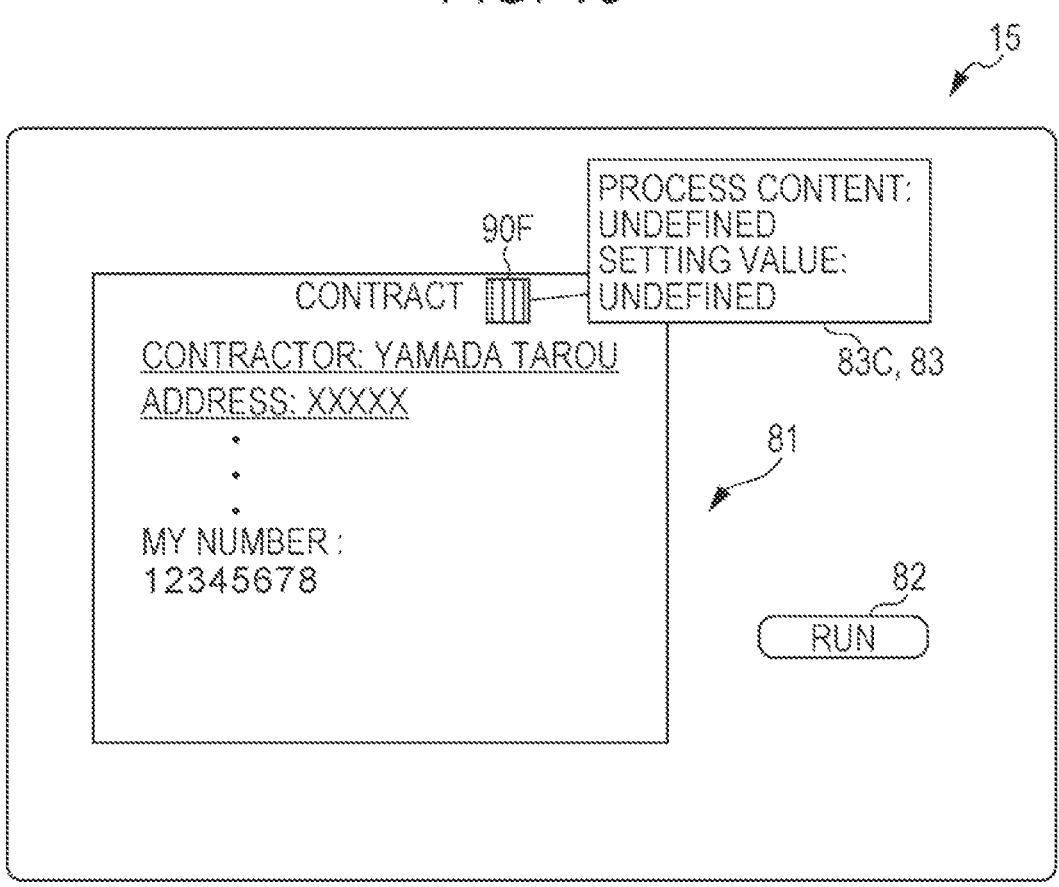
FIG. 16 illustrates an eighth display example for the preview screen.

FIG. 16 illustrates an eighth display example for the preview screen. Specifically, FIG. 16 illustrates the preview screen suitable for the placement example for the document 80 and the markers 90 illustrated in FIG. 15.

On the right of the image of the marker 90F in the captured image 81 illustrated in FIG. 16, content information 83C is displayed. For example, the content information 83C represents that the process content and the setting value in the marker 90F are undefined.

The user may define a process that is associated with the marker 90F by pressing the content information 83C with a finger.

Figure 17:
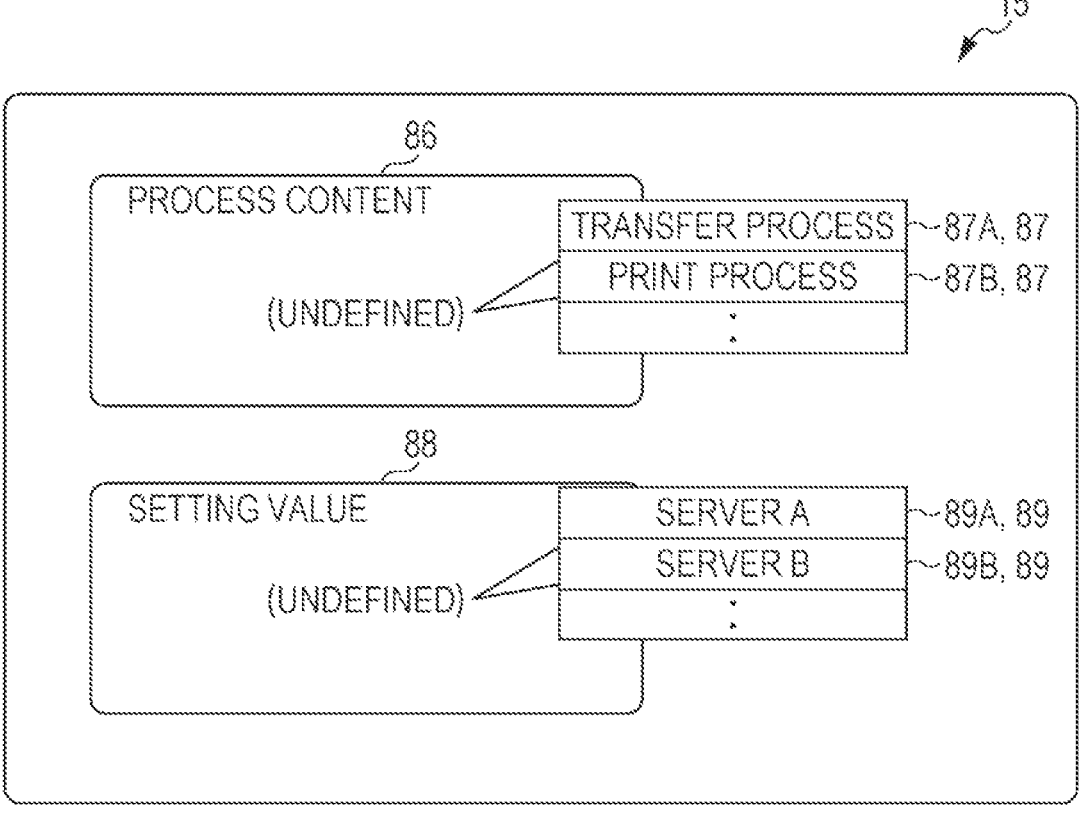
FIG. 17 illustrates a ninth display example for the preview screen.

FIG. 17 illustrates a ninth display example for the preview screen. Specifically, FIG. 17 illustrates the preview screen after the content information 83C is pressed by the finger of the user on the preview screen illustrated in FIG. 16.

A first display portion 86, a first selection portion 87, a second display portion 88, and a second selection portion 89 are displayed on the preview screen illustrated in FIG. 17.

The first display portion 86 is a portion for displaying the process content that is associated with the marker 90F. In FIG. 17, characters "UNDEFINED", for example, are displayed as the first display portion 86.

The first selection portion 87 is a portion for selecting the process content that is associated with the marker 90F. In FIG. 17, a choice 87A that represents that the process content is the "transfer process" and a choice 87B that represents that the process content is the "print process", for example, are displayed as the first selection portion 87.

The second display portion 88 is a portion for displaying the setting value that is associated with the marker 90F. In FIG. 17, the characters "UNDEFINED", for example, are displayed as the second display portion 88.

The second selection portion 89 is a portion for selecting the setting value that is associated with the marker 90F. In FIG. 17, a choice 89A that represents that the setting value is the "server A" and a choice 89B that represents that the setting value is a "server B", for example, are displayed as the second selection portion 89.

The user may define the process content and the setting value of the process associated with the marker 90F that are represented by the content information 83C by pressing the desired choices in the first selection portion 87 and the second selection portion 89 with the finger. The CPU 11 changes the content of the screen of the display 15 depending on the selection of the choices in the first selection portion 87 and the second selection portion 89.

Figure 18:
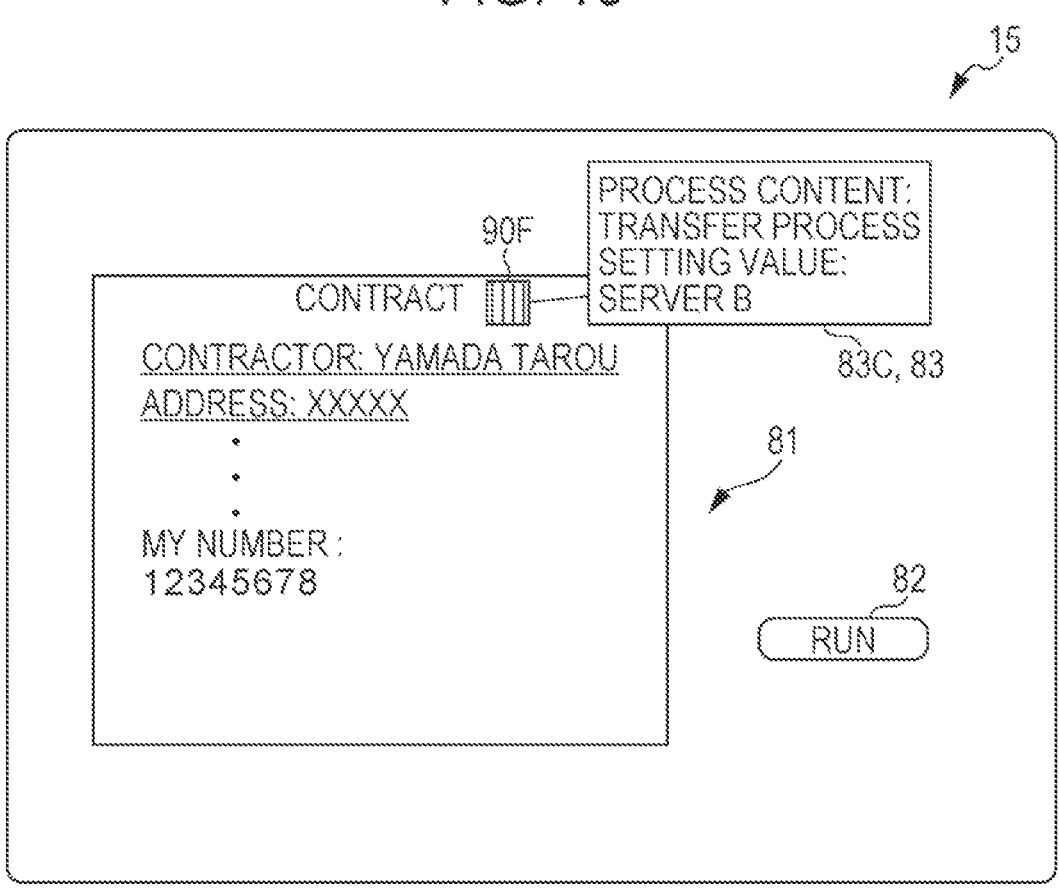
FIG. 18 illustrates a tenth display example for the preview screen.

FIG. 18 illustrates a tenth display example for the preview screen. Specifically, FIG. 18 illustrates the preview screen after the choice 87A and the choice 89B are pressed by the finger of the user on the preview screen illustrated in FIG. 17. For this reason, as for the preview screen illustrated in FIG. 18, the process content and the setting value corresponding to the choice 87A and the choice 89B are added to the content information 83C that is displayed as the characters "UNDEFINED" on the preview screen illustrated in FIG. 16. Specifically, the content information 83C illustrated in FIG. 18 represents that the process content in the marker 90F is the transfer process and that the setting value is the server B.

As for the image processing apparatus 10, the process that is associated with each of the markers 90 is defined by being selected by the user after the display 15 displays the captured image 81 as described above. In this way, the image processing apparatus 10 may allow the user to select the process that is associated with each of the markers 90 until just before the document 80 is scanned into the image data.

Fifth Exemplary Embodiment

An image processing apparatus 10 according to a fifth exemplary embodiment will now be described where the same description as the other exemplary embodiments is omitted or simplified. According to the fifth exemplary embodiment, a marker that does not contain a code such as the mechanically readable code is used as in the fourth exemplary embodiment.

Figure 19:
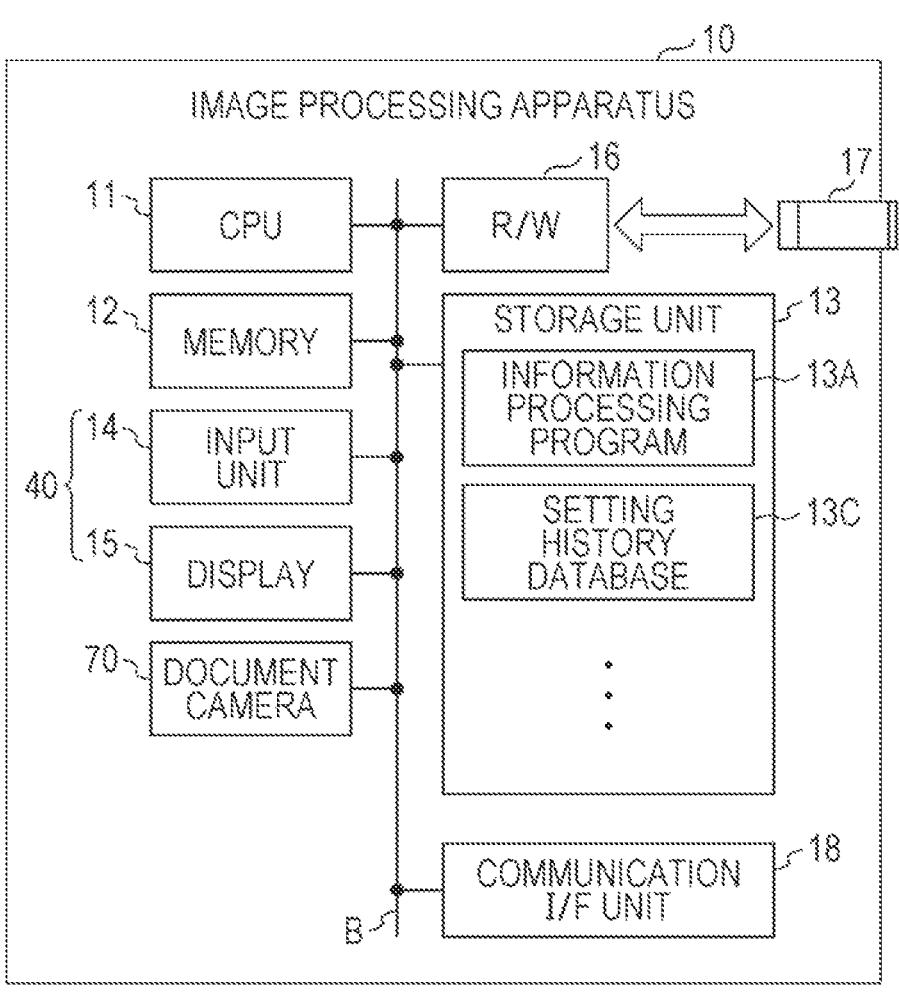
FIG. 19 is a second block diagram of an example of the hardware configuration of the electrical system of the image processing apparatus.

FIG. 19 is a second block diagram of an example of the hardware configuration of the electrical system of the image processing apparatus 10.

In the block diagram illustrated in FIG. 19, the storage unit 13 stores the information processing program 13A and a setting history database 13C unlike the block diagram illustrated in FIG. 2.

Figure 20:
FIG. 20 schematically illustrates an example of the structure of a setting history database.

The setting history database 13C will now be described with reference to FIG. 20. FIG. 20 schematically illustrates an example of the structure of the setting history database 13C.

The setting history database 13C is a database in which information about the setting history of past processes defined in the markers 90 by the user. In an example as for the setting history database 13C, as illustrated in FIG. 20, information about a username, a marker color, a setting content, and setting time and date are associated with each other and stored therein.

The username is information that represents the name of the user. The marker color is information that represents the color of each marker. The setting content is information that represents the content of the past process that is defined in each of the markers 90 in the corresponding marker color by the user. The setting time and date are information that represents time and date on which the corresponding setting content is defined in each of the markers 90.

In an example illustrated in FIG. 20, registered information represents that a user A, for example, gave one of the markers 90 in green color a filename Jul. 1 and Jul. 10, 2022.

Figure 21:
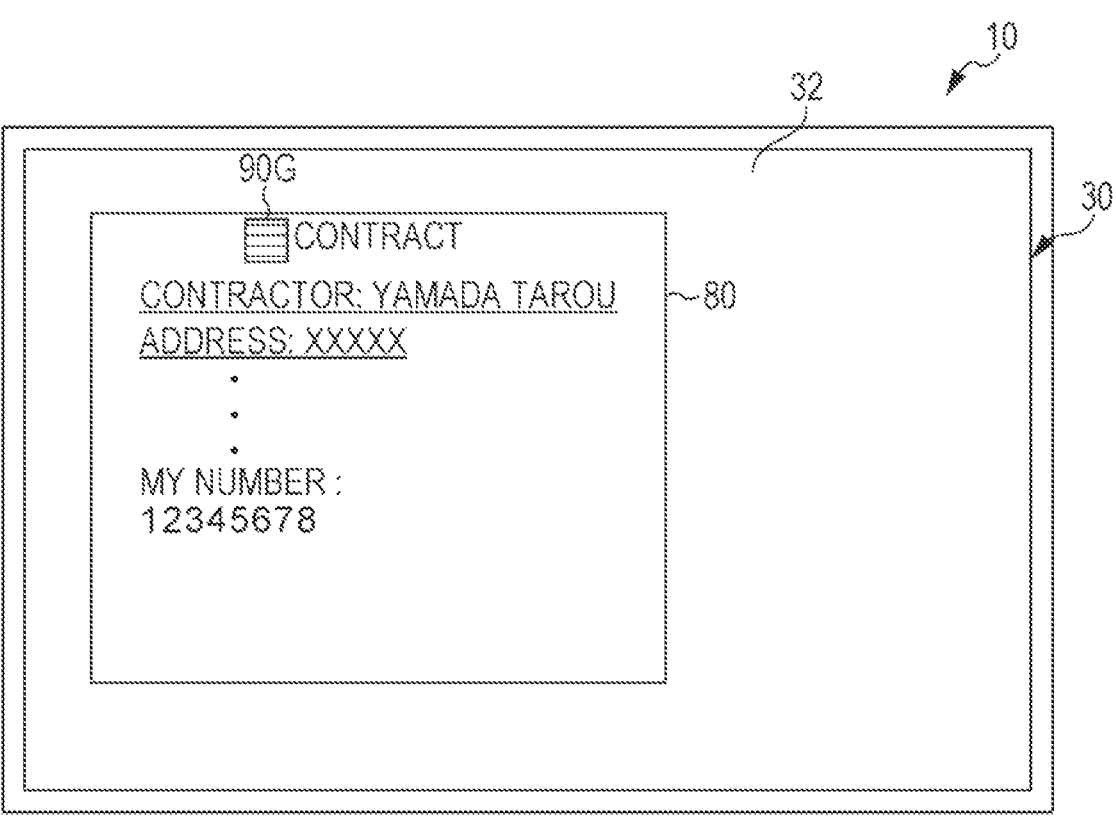
FIG. 21 illustrates a fifth placement example for the document and the markers on the document table.

FIG. 21 illustrates a fifth placement example for the document 80 and the markers 90 on the document table 30. In an example illustrated in FIG. 21, a marker 90G in green color is placed on the left of characters "CONTRACT" on the document 80. The premise of the example illustrated in FIG. 21 is that the user A logs in the image processing apparatus 10, and in this state, the document 80 and the marker 90G are placed in the document placement region 32.

Figure 22:
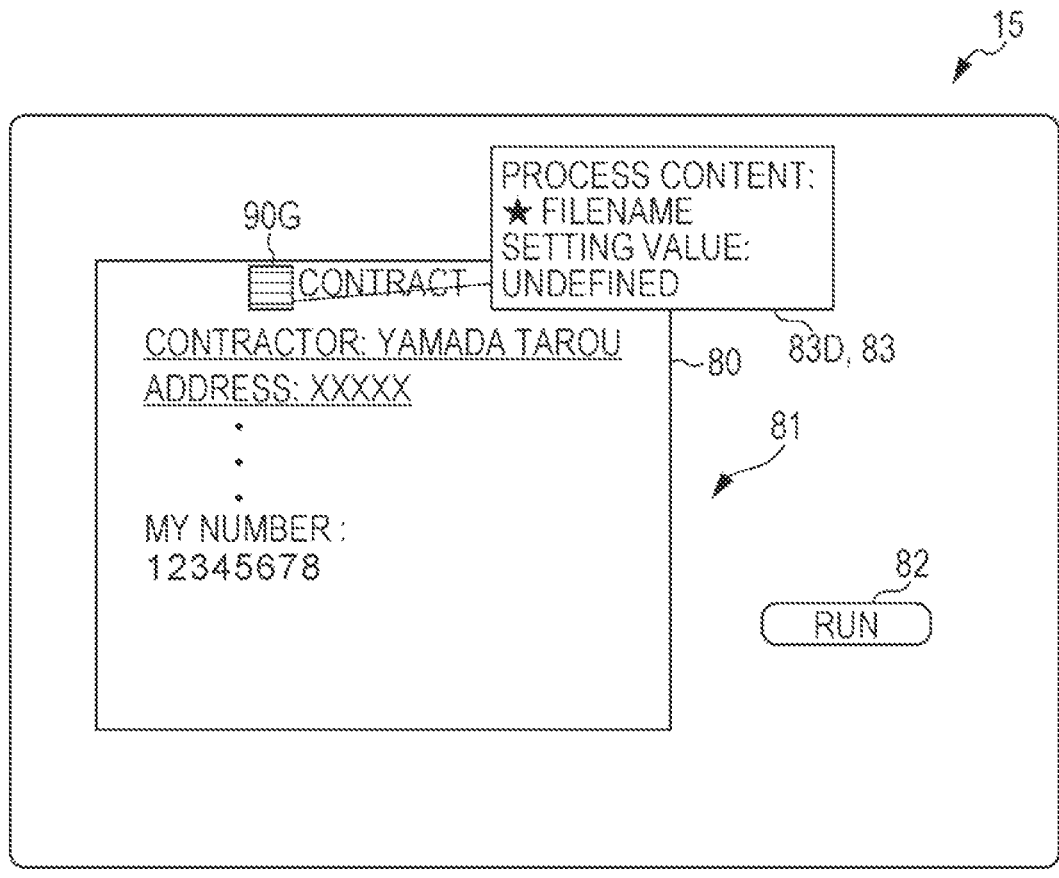
FIG. 22 illustrates an eleventh display example for the preview screen.

FIG. 22 illustrates an eleventh display example for the preview screen. Specifically, FIG. 22 illustrates the preview screen suitable for the placement example for the document 80 and the markers 90 illustrated in FIG. 21.

On the right of the image of the marker 90G in the captured image 81 illustrated in FIG. 22, content information 83D that represents the content of the process that is defined in the marker 90G is displayed. For example, the content information 83D represents that the process content in the marker 90G is to give the filename and that the setting value is "UNDEFINED". As for the content information 83D, for example, a star mark is made on the left of characters "FILENAME", and this represents that the process that is defined in the marker 90G is determined based on the setting history of the past process defined in one of the markers 90 in green color by the user A.

Specifically, the CPU 11 identifies the marker color of the marker 90G that is detected as "green color" and acquires the setting history of the user A regarding "green" marker color from the setting history database 13C. The CPU 11 determines that the process that is defined in the marker 90G is the process that is represented by the setting content (for example, to give the filename) most often defined for the "green" marker color, based on the acquired setting history of the user A.

As for the image processing apparatus 10, the CPU 11 determines the current process that is defined in each of the markers 90, based on the setting history of the past process defined in the each of the markers 90 by the user as described above.

Instead of the structure of the fifth exemplary embodiment described above, the CPU 11 may propose the current process that is defined in each of the markers 90, based on the setting history of the past process defined in the each of the markers 90 by the user.

Figure 23:
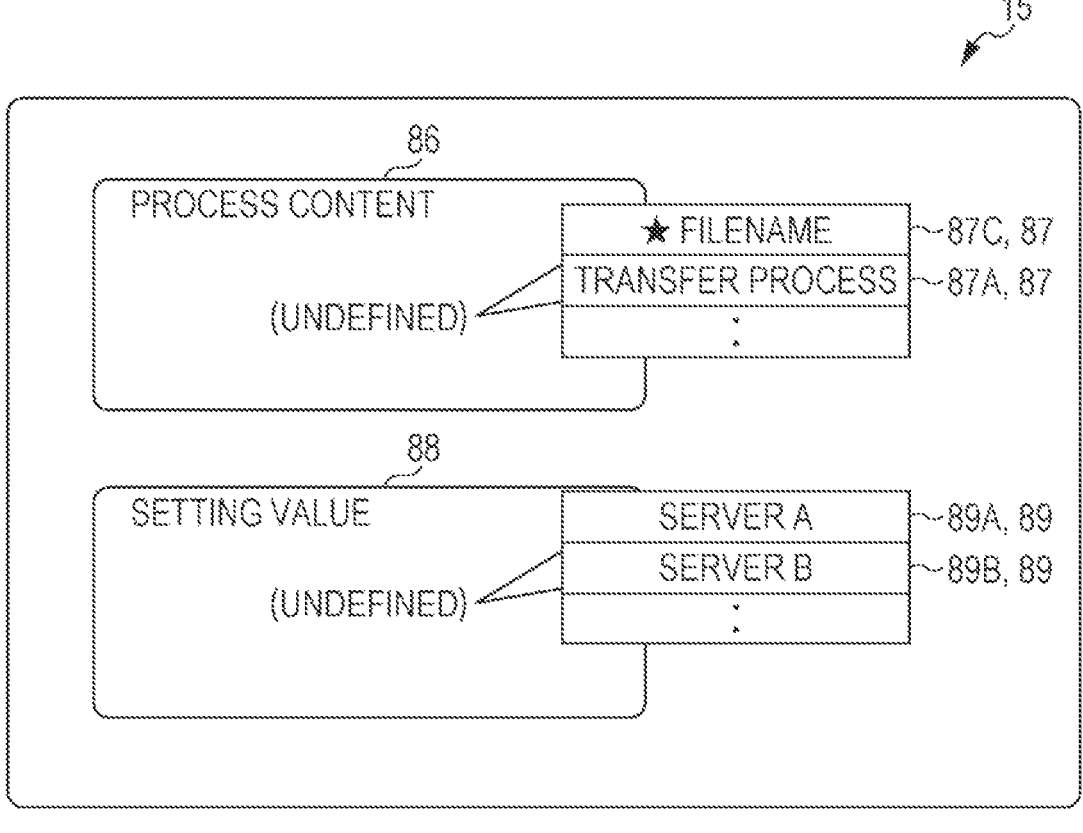
FIG. 23 illustrates a twelfth display example for the preview screen.

FIG. 23 illustrates a twelfth display example for the preview screen. Specifically, FIG. 23 illustrates the preview screen after the content information 83C is pressed by the finger of the user on the preview screen illustrated in FIG. 16.

As for the preview screen illustrated in FIG. 23, a choice 87C that represents that the process content that is associated with the marker 90F is "to give the filename" and the choice 87A that represents that the process content is the "transfer process", for example, are displayed as the first selection portion 87 in the order from above unlike the preview screen illustrated in FIG. 17. As for the preview screen illustrated in FIG. 23, the characters "FILENAME" are displayed at the uppermost position on the first selection portion 87, and the characters represent "to give the filename" that is the setting content most often defined for the "green" marker color, based on the setting history of the user A that is acquired from the setting history database 13C. As for the first selection portion 87, a star mark is made on the left of the characters "FILENAME" regarding the choice 87C that represents that the process content that is associated with the marker 90F is "to give the filename". As for the preview screen illustrated in FIG. 23, the process content that is defined in the marker 90F is proposed in this way, based on the setting history of the past process defined in one of the markers 90 in green color by the user A.

With the above configuration, the image processing apparatus 10 may recommend the process that is presumably defined in each of the markers 90 by the user to the user.

Others

According to the exemplary embodiments described above, the document may be writing on which only a character is written, writing on which only an image is displayed, or writing that is created by using a combination of a character, an image, and a symbol.

According to the exemplary embodiments described above, the CPU 11 may have a function of correcting the image data of the document 80 that is placed in the document placement region 32. For example, in the case where the position or the inclination of the document 80 in the document placement region 32 changes before or after the markers 90 are placed, it is thought that the CPU 11 corrects the change.

According to the exemplary embodiments described above, the CPU 11 may acquire a captured image with the markers 90 placed in the document placement region 32 and a captured image with no markers 90 placed in the display process illustrated in FIG. 4. For example, in the case where it is determined that the markers 90 conceal the content of the document 80, the CPU 11 may give an instruction for scanning the document 80 with no markers 90 placed.

According to the exemplary embodiments described above, the content information 83 is displayed in the form of a speech balloon. However, the form of the content information 83 that is displayed is not limited. For example, the form may be a table form outside the captured image 81.

According to the exemplary embodiments described above, the region information 84 has a rectangular frame shape illustrated by the dashed line. However, the shape of the region information 84 is not limited but may be a polygonal frame shape of a triangle, a trapezoid, a pentagon, or more, or a circular shape. The region information 84 is not limited to a frame but may be an underline.

According to the exemplary embodiments described above, the CPU 11 receives, on the preview screen, the changes in the position and shape of the region that is represented by the region information 84 by way of the user operation into the display 15. However, this is not a limitation. The CPU 11 may receive the change in at least the position or the shape of the region that is represented by the region information 84 by way of the user operation into the display 15.

According to the exemplary embodiments described above, the implementation example information 85 represents the example of performing the mask process (see FIG. 14). However, the example that is represented by the implementation example information 85 is not limited to the mask process. The implementation example information 85 may represent an example of performing processes that differ from the mask process such as an OCR process and the transfer process. For example, in the case where the implementation example information 85 represents the example of performing the OCR process, it is thought that characters "YAMADA TAROU" in the captured image 81 illustrated in FIG. 14 are extracted, and the characters "YAMADA TAROU" are displayed in a speech balloon. The implementation example information 85 that represents the example of performing the OCR process is not limited to the case where only the characters that are extracted in the OCR process (such as "YAMADA TAROU") are displayed. In another example in the case where the characters "YAMADA TAROU" in the captured image 81 illustrated in FIG. 14 are extracted in the OCR process, characters "CONTRACT_YAMADA TAROU" may be displayed as the implementation example information 85 in a speech balloon. In this case, information about the characters "CONTRACT" that are displayed as a part of the implementation example information 85 may be embedded in advance in one of the markers 90 in which the OCR process is defined. This is not a limitation. The information about the characters "CONTRACT" may be extracted based on a relationship with a process that is defined in another one of the markers 90 in the captured image 81. Alternatively, the OCR process may be performed on the characters "CONTRACT" in the captured image 81 with no markers 90 placed, and the information about the characters may be extracted.

According to the exemplary embodiments described above, in the case where the implementation example information 85 is displayed on the preview screen, the content information 83 and the region information 84 are displayed together. However, this is not a limitation. Only the implementation example information 85 may be displayed. In this case, a switch button that enables modes to be switched may be displayed on the preview screen such that a mode for displaying the implementation example information 85 and a mode for displaying the content information 83 and the region information 84 are switchable without displaying the implementation example information 85.

According to the exemplary embodiments described above, in the case where the region information 84 is displayed on the preview screen, a mode for detecting the region that is represented by the region information 84 by using the image processing apparatus 10 and a mode for changing at least the position or the shape of the region that is represented by the region information 84 by way of the user operation may be switchable. In this case, for example, it is thought that a switch button that enables the modes to be switched is displayed on the preview screen. The switch button is not limited to the case where the region information 84 is displayed on the preview screen, but the switch button may be displayed on the preview screen also in the case where the region information 84 is not displayed.

According to the exemplary embodiments described above, the process that is defined in each of the markers 90 may be changed on the preview screen.

In the description according to the exemplary embodiments described above, the document camera 70 is capable of capturing the image on the upper surface of the document table 30 but is not limited thereto. The process according to each exemplary embodiment described above may be performed on a captured image that is captured by a camera that is included in, for example, a smartphone or a laptop computer.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
An information processing apparatus includes a processor configured to: acquire a captured image of an image captured surface that is captured by an image capturer, a document and a mark portion that displays a predetermined mark being placed on the image captured surface; and cause a display to display the captured image to which content information that represents a content of a process that is defined in the mark portion and that is performed on image data is added before the document is optically read into the image data.

(((2)))
As for the information processing apparatus according to (((1))), the processor is configured to cause the display to display the captured image to which region information that represents a region that is a target for the process that is defined in the mark portion is added.

(((3)))
As for the information processing apparatus according to (((2))), the processor is configured to change the region that is represented by the region information on the display in a case where placement of the mark portion on the image captured surface is changed.

(((4)))
As for the information processing apparatus according to (((2))) or (((3))), the processor is configured to receive a change in at least a position or a shape of the region that is represented by the region information by way of a user operation into the display.

(((5)))
As for the information processing apparatus according to any one of (((2))) to (((4))), the processor is configured to cause the display to display the captured image to which implementation example information is added, the implementation example information representing an example in which the process that is defined in the mark portion is performed on the region that is represented by the region information.

(((6)))
As for the information processing apparatus according to any one of (((1))) to (((5))), a process that is associated with the mark portion is defined before the display displays the captured image.

(((7)))
As for the information processing apparatus according to (((6))), the processor is configured to: determine a current process that is defined in the mark portion, based on a setting history of a past process defined in the mark portion by a user.

(((8)))

As for the information processing apparatus according to any one of (((1))) to (((5))), a process that is associated with the mark portion is defined by being selected by a user after the display displays the captured image.

(((9)))

As for the information processing apparatus according to (((8))), the processor is configured to: propose a current process that is defined in the mark portion, based on a setting history of a past process defined in the mark portion by the user.

(((10)))

An information processing program causing a computer to execute a process including: acquiring a captured image of an image captured surface that is captured by an image capturer, a document and a mark portion that displays a predetermined mark being placed on the image captured surface; and causing a display to display the captured image to which content information that represents a content of a process that is defined in the mark portion and that is performed on image data is added before the document is optically read into the image data.

What is claimed is:

1. An information processing apparatus comprising:
a processor configured to:
    acquire a captured image of an image captured surface that is captured by an image capturer, a document and a mark portion that displays a predetermined mark being placed on the image captured surface;
    cause a display to display the captured image to which content information that represents a content of a process that is defined in the mark portion and that is performed on image data is added before the document is optically read into the image data, along with a run button upon which a user can instruct optical reading of the image data; and
    determine whether the optical reading of the image data is instructed via the run button after the display displays the captured image with the content information added.

2. The information processing apparatus according to claim 1,
wherein the processor is configured to:
    cause the display to display the captured image to which region information that represents a region that is a target for the process that is defined in the mark portion is added.

3. The information processing apparatus according to claim 2,
wherein the processor is configured to:
    change the region that is represented by the region information on the display in a case where placement of the mark portion on the image captured surface is changed.

4. The information processing apparatus according to claim 2,
wherein the processor is configured to:
    receive a change in at least a position or a shape of the region that is represented by the region information by way of a user operation into the display.

5. The information processing apparatus according to claim 2,
wherein the processor is configured to:
    cause the display to display the captured image to which implementation example information is added, the implementation example information representing an example in which the process that is defined in the mark portion is performed on the region that is represented by the region information.

6. The information processing apparatus according to claim 1,
wherein a process that is associated with the mark portion is defined before the display displays the captured image.

7. The information processing apparatus according to claim 6,
wherein the processor is configured to:
    determine a current process that is defined in the mark portion, based on a setting history of a past process defined in the mark portion by a user.

8. The information processing apparatus according to claim 1,
wherein a process that is associated with the mark portion is defined by being selected by a user after the display displays the captured image.

9. The information processing apparatus according to claim 8,
wherein the processor is configured to:
    propose a current process that is defined in the mark portion, based on a setting history of a past process defined in the mark portion by the user.

10. A non-transitory computer readable medium storing a program causing a computer to execute a process for information processing, the process comprising:
acquiring a captured image of an image captured surface that is captured by an image capturer, a document and a mark portion that displays a predetermined mark being placed on the image captured surface;
causing a display to display the captured image to which content information that represents a content of a process that is defined in the mark portion and that is performed on image data is added before the document is optically read into the image data, along with a run button upon which a user can instruct optical reading of the image data; and
determining whether the optical reading of the image data is instructed via the run button after the display displays the captured image with the content information added.

11. A method comprising:
acquiring a captured image of an image captured surface that is captured by an image capturer, a document and a mark portion that displays a predetermined mark being placed on the image captured surface;
causing a display to display the captured image to which content information that represents a content of a process that is defined in the mark portion and that is performed on image data is added before the document is optically read into the image data, along with a run button upon which a user can instruct optical reading of the image data, and
determining whether the optical reading of the image data is instructed via the run button after the display displays the captured image with the content information added.

* * * * *